United States Patent Office 3,062,837
Patented Nov. 6, 1962

3,062,837
METHOD OF PREPARING β-LACTONES OF 2,2,4,4-TETRAALKYL-3-HYDROXY-3-BUTENOIC ACIDS BY CATALYTIC REARRANGEMENT OF TETRAALKYL-1,3-CYCLOBUTANEDIONES
Raymond Donald Clark, Kingsport, Tenn., assignor to Eastman Kodak Company, Rochester, N.Y., a corporation of New Jersey
No Drawing. Filed May 9, 1961, Ser. No. 108,739
7 Claims. (Cl. 260—343.9)

This invention relates to a novel method for preparing certain unsaturated β-lactones. More particularly, it relates to a method of preparing the β-lactones of 2,2,4,4-tetraalkyl-3-hydroxy-3-butenoic acids by a rearrangement of tetraalkyl-1,3-cyclobutanediones in the presence of a Lewis acid as a catalyst.

The compounds produced by the method of the invention are unsaturated β-lactones of the formula:

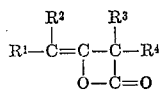

wherein $R^1$, $R^2$, $R^3$ and $R^4$ are alkyl radicals of from 1 to 4 carbon atoms. The pair of substituents $R^1$ and $R^2$ and the pair of substituents $R^3$ and $R^4$ can also be alkylene groups which, with the carbon atom to which they are attached, form a 5 or 6 membered saturated carbocyclic ring.

Lactones of this type are valuable intermediates in the preparation of a number of useful products. For example, when contacted with a strongly basic catalyst such as sodium methoxide in a solvent such as ether or benzene they form useful crystalline polymers. They are also useful as intermediates in the preparation of valuable allenic compounds. For instance, tetramethylallene is produced in good yield by pyrolysis of 2,2,4-trimethyl-3-hydroxy-3-pentenoic acid β-lactone at a temperature, e.g., of 450° C. Still further, the lactones are useful starting materials in the preparation of tetraalkyl-acetoacetic esters by reaction with a hydroxyl compound such as methanol. As chemical reagents or intermediates the lactones of my invention have important advantages over the previously known dialkylketene dimers, i.e., the tetraalkyl-1,3-cyclobutanediones. For example, while tetramethyl-1,3-cyclobutane-dione is a volatile, easily sublimed solid, the isomeric lactone is a liquid at normal temperature and pressure and is, therefore, much more convenient to employ as a reagent.

These lactones art disclosed as novel compounds in the copending U.S. patent application of Edward U. Elam entitled "Unsaturated β-Lactones and Method of Preparing Them," S.N. 108,740, filed on the same day as the present application. Elam discloses a method of preparation in which a dialkyl ketene is contacted with a strongly basic polymerization catalyst such as an alkali metal alkoxide in an inert solvent to obtain a solid polymer. This polymer is then decomposed by pyrolysis to yield a 2,2,4,4-tetra-alkyl-3-hydroxy-3-butenoic acid β-lactone. The method disclosed by Elam is a valuable method for producing the lactones but I have developed another method whereby lactones of this type can be obtained by the catalytic rearrangement of their isomers, the tetraalkyl-1,3-cyclobutanediones, without the necessity of forming and decomposing a solid polymer.

The method of my invention, in general, comprises contacting a tetraalkyl-1,3-cyclobutanedione with a catalytic amount of a Lewis acid such as aluminum chloride and recovering a reaction product comprising a 2,2,4,4-tetraalkyl-3-hydroxy-3-butenoic acid β-lactone. (The term "Lewis acid" is used herein to designate an aprotonic acid of the Lewis type and is described more fully hereinafter.)

In preferred modifications of the method the reaction is carried out at a temperature in the range of 40–300° C. and most preferably at 100–175° C. The reaction is rapid and exothermic for the lowest member of the homologous series (tetramethyl-1,3-cyclobutanedione) but the higher members require heating for varying lengths of time depending on such factors as concentration and temperature. When the reaction is complete the product can be purified by distillation.

Although I do not wish to be bound by theoretical explanations of the method of my invention, the following mechanism is the probable course of reaction:

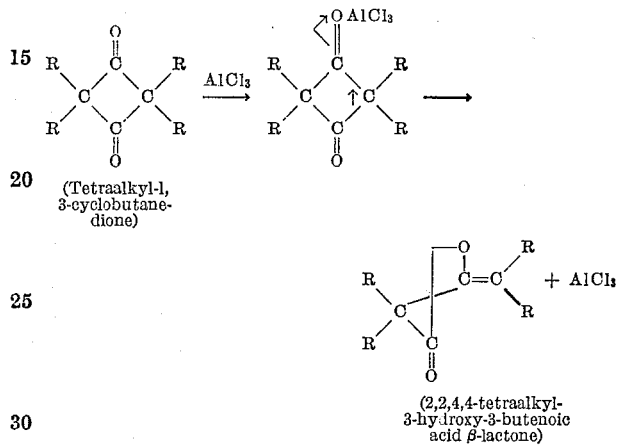

(Tetraalkyl-1,3-cyclobutanedione)

(2,2,4,4-tetraalkyl-3-hydroxy-3-butenoic acid β-lactone)

The structure of the lactone product obtained by my novel method has been established by three analytical methods: (1) elementary analysis, (2) infrared spectroscopy, and (3) nuclear magnetic resonance spectroscopy.

The starting materials for producing lactones of the formula,

by my method are tetra-substituted 1,3-cyclobutanediones of the formula,

wherein the substituents, R, are alkyl groups of 1 to 4 carbon atoms or are alkylene groups which, with the carbon atom to which they are attached, form a 5 or 6 membered saturated carbocyclic ring. For convenience, I use the term "tetraalkyl-1,3-cyclobutanediones" to cover all of such tetra-substituted 1,3-cyclobutanediols. Likewise, the designation of the product as a tetraalkyl-substituted lactone is intended to include the indicated alkylene-substituted ring compounds.

The tetraalkyl-1,3-cyclobutanediones used in the method of the invention are readily prepared by dimerization of dialkyl ketenes ("Organic Reactions," R. Adams, editor, John Wiley and Sons, New York, 1946, vol. 3, chapter 3, W. E. Hanford and J. G. Sauer, "Preparation of Ketenes and Ketene Dimers"). The dialkyl ketenes are available in quantity by a process described in the copending application of R. H. Hasek and E. U. Elam, S.N. 841,961, filed September 24, 1959.

The reaction can be carried out in the presence of or in the absence of a solvent. The use of a solvent facilitates contact between the catalyst and the starting material and aids in temperature control. The solvent should be inert or at least should not react rapidly with the starting materials, the catalyst, or the product. Suitable solvents include hydrocarbons such as heptane, ethers such as dipropyl ether, and ketones such as diisopropyl ketone. The β-lactone dimers themselves are also good solvents. The reaction can be carried out in the absence of a solvent simply by mixing the Lewis acid with the tetraalkyl-1,3-cyclobutanedione. If no solvent is used the purification of the product is simplified.

The concentrations of the tetraalkyl-1,3-cyclobutanedione and the Lewis acid catalyst determine the rate of reaction, the rate being more rapid with higher concentrations of these materials. The molar ratio of the Lewis acid to the tetraalkyl-1,3-cyclobutanedione can vary from about 0.001 to 0.5:1. The higher ratios give no particular advantage over the lower ones except in overcoming the effect of small concentrations of protonic contaminants.

The manner of mixing of the dione with the catalyst can be varied to meet the demands of the reaction vessel. Thus, tetraalkyl-1,3-cyclobutanedione can be gradually added to the Lewis acid heated in a vessel. Another procedure is to mix the two materials and then heat the mixture. Still another procedure is to add the Lewis acid to the tetraalkyl-1,3-cyclobutanedione heated in a vessel.

The reaction is most easily carried out at a temperature in the range of 100–175° C. However, the reaction occurs at a detectable rate at considerably lower temperatures, e.g., as low as about 40° C. Temperatures above 175° C. usually are less satisfactory because pressure vessels are required if the temperature is above the boiling point of the product. Temperatures as high as 300° C. can be used but substantially higher temperatures should be avoided so as to avoid decomposing the lactone product.

The time of reaction depends upon the particular Lewis acid employed and the reaction temperature. With a high temperature and a strong Lewis acid, e.g., 170 C., aluminum chloride and tetramethyl-1,3-cyclobutanedione, the reaction is complete within a few minutes. With low temperature or a weak Lewis acid the time required may vary from a few hours to several weeks.

As I have indicated, the present invention is based on my discovery that aprotonic acids of the Lewis type catalyze the conversion of tetraalkyl-1,3-cyclobutanediones to 2,2,4,4-tetraalkyl-3-hydroxy-3-butenoic acid β-lactones. As defined by G. N. Lewis ["Valence and the Structure of Atoms and Molecules," Chemical Catalogue Co., N.Y., 1923; J. Franklin Inst. 226, 243 (1938)], an acid is a substance that can accept a pair of electrons from another substance to form a chemical bond. Lewis' broad definition includes substances that are proton donors, such as hydrochloric acid, and substances that accept electrons but do not furnish protons, for instance, boron trifluoride. Acids that donate protons are designated as protonic. Those that merely accept electrons but do not donate protons are called aprotonic.

The latter type of acid is referred to in this specification as an "aprotonic Lewis acid" or simply as a "Lewis acid." I use these terms to distinguish from the protonic acids or so-called Brönsted acids. Only aprotonic Lewis acids are suitable in the method of the invention. Protonic acids are unsuitable. They either fail to achieve conversion of the tetraalkyl-1,3-cyclobutanediones or cause the formation of products other than the desired lactones. Certain solvents are also unsuitable because they have an available proton. Such unsuitable solvents include water, alcohols and amines. However, the presence of a small amount of an unsuitable solvent such as water in a solvent such as heptane can be overcome by the use of a sufficient amount of the anhydrous Lewis acid.

A large number of the described aprotonic acids of the Lewis type as used in the method of the invention are available. They include such materials as boron trifluoride, silicon tetrachloride, phosphorous pentoxide, sulfur dioxide, aluminum chloride, antimony pentachloride, ferric chloride, stannic chloride, boron trifluoride, titanium tetrachloride, zinc bromide, zinc chloride, etc.

The following examples illustrate the method of the invention:

Example 1

Tetramethyl-1,3-cyclobutanedione (1,000 g.) was melted, and to the melt was added 1.0 g. of anhydrous aluminum chloride. An exothermic reaction ensued raising the temperture to 153° C. When the temperature began to drop, heating was resumed and after 15 min. boiling began. The mixture was heated under reflux for 30 min. The product was rapidly distilled through a short Vigreux column; the yield of crude 2,2,4-trimethyl-3-hydroxy-3-pentenoic acid, β-lactone was 868.2 g. (87%), B.P. 165–175° C. Gas chromatographic analysis revealed that the product was about 94% pure, the principal impurity being tetramethyl-1,3-cyclobutanedione. Distillation of an aliquot returned 78% of it as the pure β-lactone of 2,2,4-trimethyl-3-hydroxy-3-pentenoic acid, B.P. 119.5–120° C. at 150 mm. Hg, $n_D^{20}$ 1.4380. *Analysis.*—Calcd. for $C_8H_{12}O_2$: C, 68.54; H, 8.63; mol. wt., 140; sap. eq., 140.18. Found: C, 68.42; H, 8.95; mol. wt., 127, 131; sap. eq., 141.0.

The infrared spectrum of the product of the above example is in agreement with its formulation as the β-lactone dimer of dimethyl ketene. Strong bands were observed at $5.32\mu$ and $5.48\mu$. Bellamy notes that β-lactones absorb in this region (L. J. Bellamy, "The Infrared Spectra of Complex Molecules," John Wiley and Sons, Inc., New York, 1954, p. 188). Another strong band appears at $5.73\mu$. These three bands apparently are characteristic of the unsaturated β-lactone structure. Diketene itself has a strong doublet band at $5.27\mu$ and $5.37\mu$ and another strong band at $5.88\mu$ (H. M. Randall, R. G. Fowler, Nelson Fuson and J. R. Dangl, "Infrared Determination of Organic Structures," D. Van Nostrum Co., Inc., New York, 1949, p. 164). The similarities in the infrared spectra of diketene and of the compound obtained in the example indicate a similarity of structure. The nuclear magnetic resonance spectrum of the compound also was in agreement with that expected of the structure.

Example 2

Tetramethyl-1,3-cyclobutanedione (101.2 g.) was melted. To the melt was added 1.28 g. of zinc chloride which had been freshly fused and ground to a powder. The mixture was heated to 154° C. during one hour and then was maintained at 154±15° C. for 165 hr. After the period of heating the product was distilled through a packed column. 2,2,4-trimethyl-3-hydroxy-3-pentenoic acid, β-lactone was collected in two fractions weighing together 25.52 g. (25%), B.P. 170–171° C., $n_D^{20}$ 1.4378–1.4380. The infrared spectrum of the product is identical to that of an authentic sample of the β-lactone dimer of dimethyl ketene.

Example 3

Dimethyldiethyl-1,3-cyclobutanedione (133.6 g.) was heated to 150° C. and to it was added 0.2 g. of anhydrous aluminum chloride. The mixture was heated to boiling but apparently no reaction occurred; consequently it was cooled and 1.32 g. more of anhydrous aluminum chloride was added. Again, the mixture was heated to boiling and maintained at the temperature for 3 hr. After this period of heating the mixture was cooled and 1.64 g. more of anhydrous aluminum chloride was added, making a total of 3.16 g. of aluminum chloride added. The mixture was again heated to reflux. A sizeable quantity of hydrogen chloride was liberated indicating the presence of an impurity containing an easily removable proton. The mixture was heated under reflux for 3 hr. and then was allowed to stand at room temperture for 3 days. Volatile material then was distilled rapidly through a short Vigreux column; yield: 98.35 g., B.P. 170–202° C. This material was re-distilled through a packed column. The β-lactone of 2,4-dimethyl-2-ethyl-3-hydroxy-3-hexenoic acid was obtained in two fractions weighing together 41.65 g. (31%), B.P. 82–83° C. at 10 mm. Hg, $n_D^{20}$ 1.4449–1.4450. *Analysis.*—Calcd. for $C_{10}H_{16}O_2$: C, 71.39; H. 9.59; mol. wt., 168; sap. eq., 168. Found: C, 71.19; H, 9.43; mol. wt., 154, 152 sap. eq., 168.4. The infrared spectrum of the product was quite similar to that of the β-lactone of 2,2,4-trimethyl-3-hydroxy-3-pentenoic acid.

Although the invention has been described in considerable detail with reference to certain preferred embodiments thereof, it will be understood that variations and modifications can be effected within the spirit and scope of the invention as described hereinabove and as defined in the appended claims.

I claim:
1. The method which comprises contacting with a catalytic amount of an aprotonic Lewis acid a tetraalkyl-1,3-cyclobutanedione of the formula,

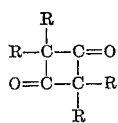

wherein the substituents, R, are selected from the group consisting of alkyl groups of from 1 to 4 carbon atoms and alkylene groups which, with the carbon atom to which they are attached, form a saturated carbocyclic ring of 5 to 6 carbon atoms, and recovering as product a lactone of the formula,

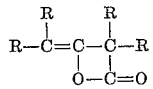

2. The method of preparing a 2,2,4,4,-tetraalkyl-3-hydroxy-3-butenoic acid β-lactone which comprises contacting with a catalytic amount of an aprotonic Lewis acid a tetraalkyl-1,3-cyclobutanedione of which the alkyl groups have from 1 to 4 carbon atoms at a temperature of about 40 to 300° C. and recovering such lactone as product.

3. The method of preparting a 2,2,4,4-tetraalkyl-3-hydroxy-3-butenoic acid β-lactone which comprises forming a mixture consisting essentially of tetraalkyl-1,3-cyclobutanedione of which the alkyl groups have from 1 to 4 carbon atoms and a catalytic amount of an aprotonic Lewis acid, heating the mixture, distilling the resulting reaction product and recovering a distillate comprising said lactone.

4. The method of preparing a 2,2,4,4-tetraalkyl-3-hydroxy-3-butenoic acid β-lactone which comprises forming a reaction mixture comprising a tetraalkyl-1,3-cyclobutanedione of which the alkyl groups have from 1 to 4 carbon atoms, an inert solvent, and an aprotonic Lewis acid in the amount of 0.001 to 0.5 mol per mol of dione, maintaining said reaction mixture at a temperature of 100 to 175° C. and recovering a reaction product comprising said lactone.

5. The method which comprises forming a reaction mixture of 2,2,4,4-tetramethyl-1,3-cyclobutanedione and a catalytic amount of anhydrous aluminum chloride, maintaining the reaction mixture at a temperature of 100 to 175° C. and recovering a reaction product comprising 2,2,4-trimethyl-3-hydroxy-3-pentenoic acid β-lactone.

6. The method which comprises forming a reaction mixture of 2,2,4,4-tetramethyl-1,3-cyclobutanedione and a catalytic amount of anhydrous zinc chloride, maintaining the reaction mixture at a temperature of 100 to 175° C. and recovering a reaction product comprising 2,2,4-trimethyl-3-hydroxy-3-pentenoic acid β-lactone.

7. The method which comprises forming a reaction mixture of dimethyldiethyl-1,3-cyclobutanedione and a catalytic amount of anhydrous aluminum chloride, maintaining the reaction mixture at a temperature of 100 to 175° C. and recovering a reaction product comprising the β-lactone of 2,4-dimethyl-2-ethyl-3-hydroxy-3-hexenoic acid.

No reference cited.